July 31, 1951

E. P. BONFIETTI 2,562,596

BOAT TRAILER

Filed July 25, 1949

Ebi P. Bonfietti
INVENTOR.

BY *Clarence A. O'Brien
and Harvey B. Jacobson*
Attorneys

July 31, 1951  E. P. BONFIETTI  2,562,596
BOAT TRAILER

Filed July 25, 1949  2 Sheets-Sheet 2

Ebi P. Bonfietti
INVENTOR.

BY *Clarence A. O'Brien*
*and Harvey B. Jackson*
Attorneys

Patented July 31, 1951

2,562,596

UNITED STATES PATENT OFFICE 2,562,596

BOAT TRAILER

Ebi P. Bonfietti, Clearwater, Fla.

Application July 25, 1949, Serial No. 106,633

1 Claim. (Cl. 214—65)

This invention relates to new and useful improvements and structural refinements in boat trailers, and the principal object of the invention is to facilitate convenient and expeditious handling of small boats of different types, that is, raising such boats out of water, transporting them across land, and lowering the same into water or on the ground, as desired.

This object is achieved by the provision of the instant trailer which, of course, is adapted for attachment to an automobile or a similar vehicle, and an important feature of the invention resides in the structural arrangement of the trailer which is such that the trailer itself constitutes a lever for raising and lowering the boat, so that, in effect, the trailer is self-loading and unloading, these operations being effected in a very simple manner and with the expenditure of a minimum amount of effort.

Other features of the invention reside in the structural arrangement of the trailer itself, and in the provision of means on the trailer and on a boat whereby the former efficiently supports the latter.

Some of the advantages of the invention reside in its simplicity of construction, in its pleasing appearance, and in its adaptability to economical manufacture.

With the above more important objects and features in view and such other object and features as may become apparent as this specification proceeds, the invention consists essentially in the arrangement and construction of parts as illustrated in the accompanying drawings, in which:

Figure 4 is a perspective view of keeper means used in the invention;

Figure 5 is a perspective view of a supporting element; and

Like characters of reference are employed to designate like parts in the specification and throughout the several views.

Figure 1:
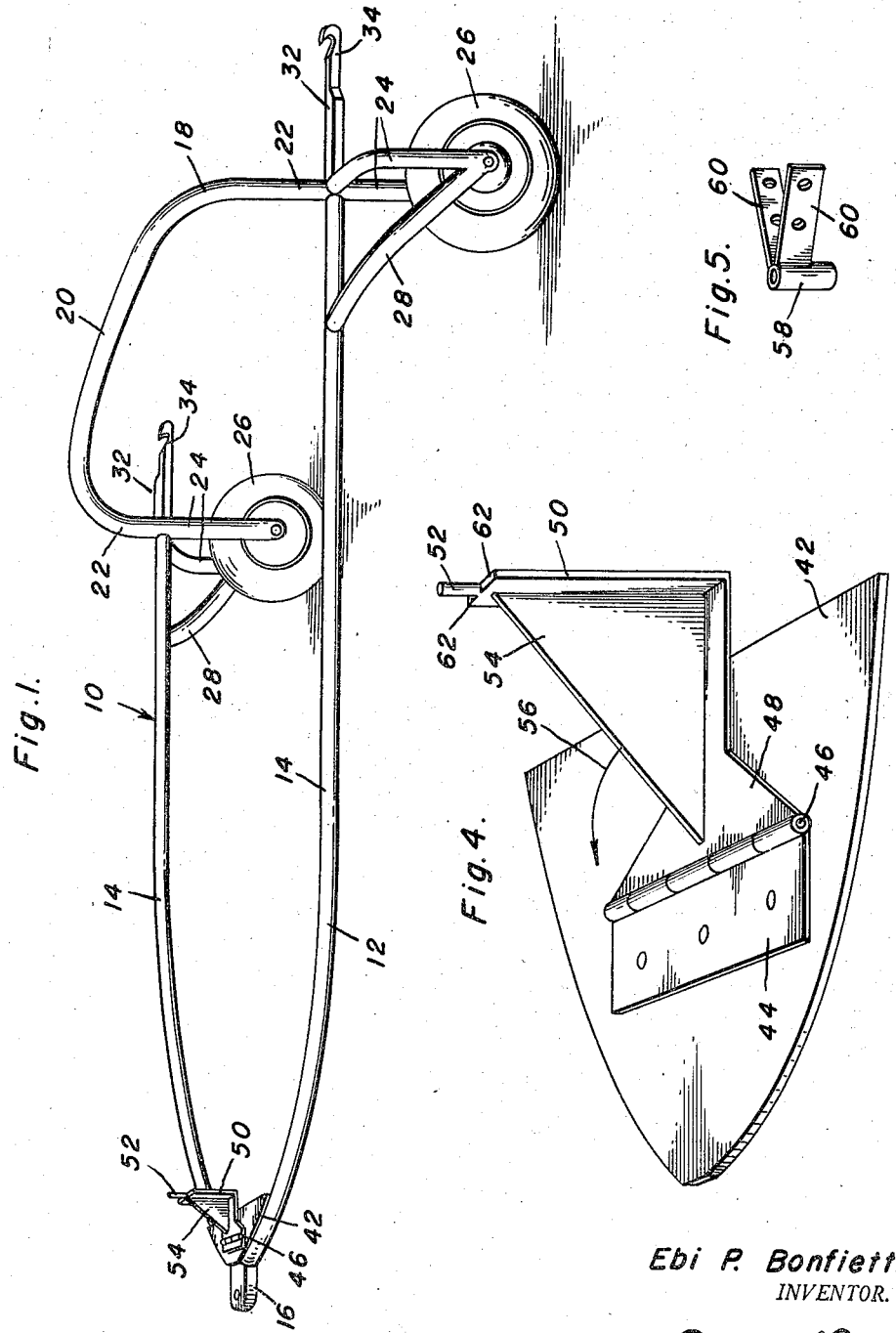
Figure 1 is a perspective view of the invention.

Referring now to the accompanying drawings in detail, the invention consists of a self-loading and unloading boat trailer designated generally by the reference character 10, the same embodying in its construction an elongated frame 12 consisting of a pair of spaced side members 14 having convergent forward ends welded or otherwise secured together and provided with a suitable hitch 16, whereby the entire trailer may be connected to an automobile, or a similar vehicle.

An inverted, substantially U-shaped cross member 18 has an arched intermediate portion 20 and a pair of spaced side portions 22, the latter being secured to rear end portions of the side members 14, and lower end portions of the side members 22, assuming the form of forks 24, are disposed below the level of the side members 14, as is best shown in Figure 1.

A travelling wheel 26 is rotatably mounted in each of the forks 24 and, if desired, reinforcing struts 28 may be provided between the forks and the side members 14, substantially as shown.

It will be apparent from the foregoing that the frame 12 is well adapted to straddle a boat, such as that illustrated at 30, and means are provided on the frame for engaging and supporting the boat, as will be presently described.

These means include a pair of elongated hooks 32 which are welded or otherwise secured to the side portions 22 of the cross member 18 and, in effect, constitute longitudinal, rearward continuations of the frame side members 14, substantially as shown. It is to be noted that the hooks 32 are provided in the upper edges thereof with forwardly inclined recesses or slots 34, these being adapted to engage a pair of supporting elements or trunnions 36 secured to the sides of the boat 30.

The trunnions 36 are substantially frusto-conical so that they are readily receivable in the recesses or slots 34 of the hooks 32, and it is to be noted that the trunnions are provided with suitable mounting flanges 38 whereby attachment thereof to the sides of the boat is facilitated. It will be also observed that the outer ends of the laterally projecting trunnions are equipped with downwardly and outwardly extending keeper pads 40, which prevent the trunnions from becoming displaced laterally from the slots 34.

In addition to the foregoing, a substantially triangular plate 42 is secured to the convergent forward end portions of the frame side members 14 and one leaf 44 of a hinge 46 is, in turn, secured to the plate 42, as is best shown in Figure 4. The second leaf 48 of the hinge 46 is provided with an upward extension 50 which, in turn, terminates in a keeper pin 52, and a reinforcing gusset 54 may be provided between the hinge leaf 48 and its extension 50, as shown.

Figure 2:
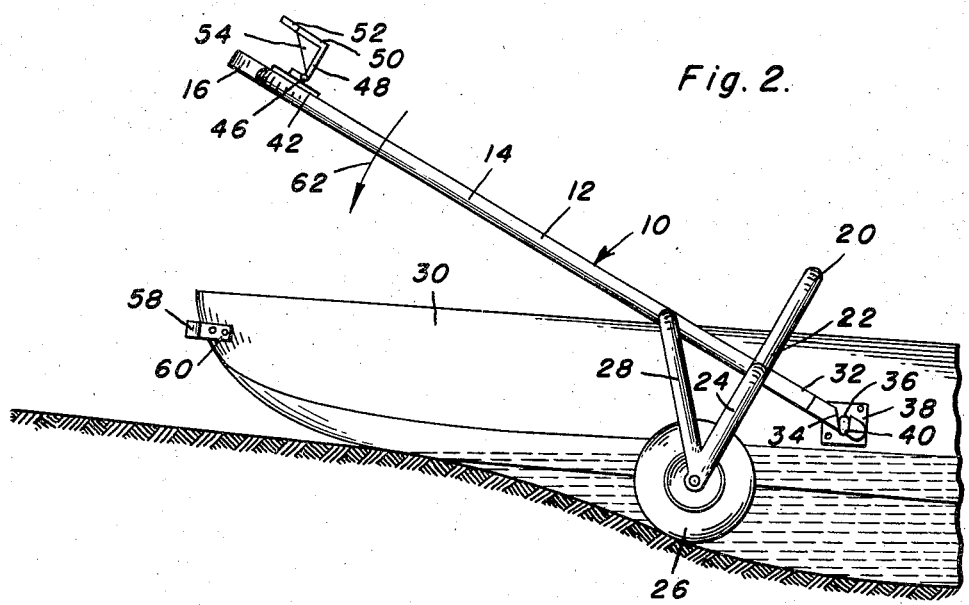
Figure 2 is a side elevational view showing the invention being applied to a boat for the purpose of raising the latter out of water.
Figure 3:
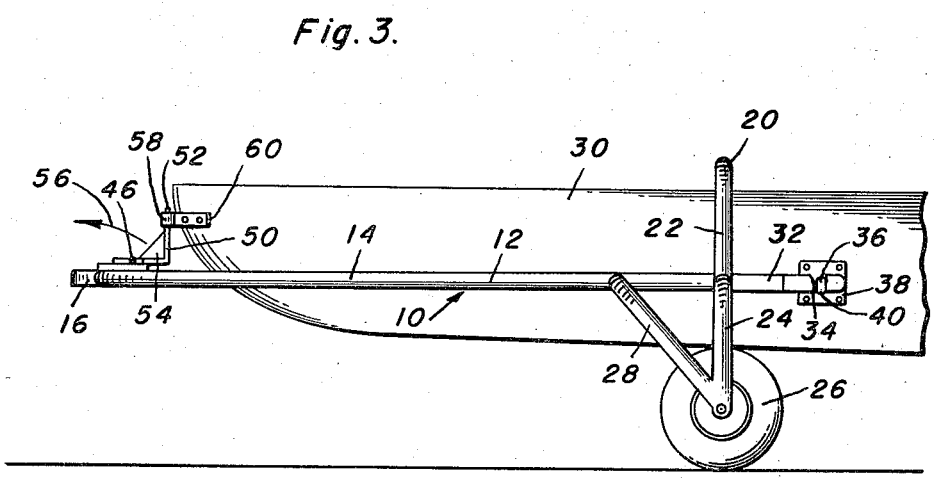
Figure 3 is a side elevational view, similar to that shown in Figure 2, but illustrating the boat as being supported by the invention and in readiness for transportation over land.
Figure 6:
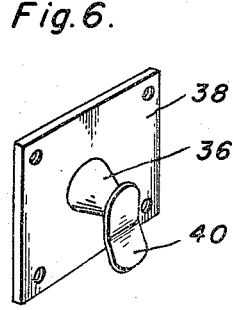
Figure 6 is a perspective view of another supporting element.

The hinge 46 is so arranged that when the leaf 48 thereof rests upon the plate 42, the pin 52 is substantially vertical as shown in Figures 3 and 4, but by virtue of the hinge the extension 50 may be swung forwardly, as at 56, so that it assumes the position illustrated in Figure 2.

Finally, the invention involves the provision of another supporting element in the form of a vertically disposed, tubular socket 58 which is secured by means of a pair of divergent mounting straps or plates 60 to the bow portion of the boat, as will be clearly apparent.

When the invention is placed in use, such as for example, for raising a boat out of water for transportation over land, the entire trailer is tipped as shown in Figure 2 and the wheels 26 thereof are pushed into the water, until the hooks 32 are brought in alignment with the trunnions 36, so that the trunnions may be engaged with the hooks, that is, with the slots 34 of the hooks, as shown. It is to be noted that this operation may be performed without the necessity of the operator entering the water.

In any event, the trailer is then swung downwardly as shown at 62, this being done while the hinge lead 48 and extension 50 are swung forwardly as shown in Figure 2, so that the forward portion of the frame 12 may be passed downwardly over the bow of the boat until the hitch member 16 touches the ground.

The hinge leaf 48 and the extension 50 are then swung rearwardly so that the leaf 48 rests upon the plate 42, whereupon the frame 12, that is, the forward portion of the frame, is raised so that the pin 52 enters the socket 58 and supports the bow portion of the boat as shown in Figure 3, while the trailer together with the boat are being transported. It is to be noted that the extension 50 is substantially wider than the diameter of the pin 52, thus resulting in the formation of a pair of supporting shoulders 60 at the base of the pin 52, which shoulders supportably engage the lower end of the socket 58.

It will be apparent from the foregoing that the trailer is, in effect, self-loading and unloading, since the frame 12 rocks on the axis of the travelling wheels 26 while the boat is being raised or lowered, the frame of the trailer actually constituting a lever of considerable mechanical advantage, whereby the loading and unloading operation may be effected with considerable ease and convenience.

Needless to say, the lowering of the boat on water or on land is effected by simply reversing the raising procedure already described.

It is believed that the advantages and use of the invention will be clearly apparent from the foregoing disclosure and, accordingly, further description thereof at this point is deemed unnecessary.

Having described the invention, what is claimed as new is:

In a boat trailer, a wheeled frame including a pair of side members adapted to straddle a boat and having convergent forward ends thereof secured together, boat engaging and supporting means provided at the rear ends of said side members, a horizontal plate secured to the forward end portions of the side members, a hinge having one leaf thereof secured to said plate, the second leaf of said hinge being substantially L-shaped and affording an inner arm and an outer arm, and an upwardly projecting pin provided at the free end of said outer arm for reception in a socket at the bow of a boat, said second leaf of said hinge being swingable from an operative position wherein said pin is substantially vertical and said inner arm rests upon said plate to an inoperative position wherein the inner arm is swung upwardly from the plate and the outer arm projects forwardly therefrom.

EBI P. BONFIETTI.

REFERENCES CITED

The following references are of record in the file of this patent:

UNITED STATES PATENTS

| Number | Name | Date |
| --- | --- | --- |
| 734,543 | Hadley | July 28, 1903 |
| 1,471,403 | Madigan | Oct. 23, 1923 |
| 2,289,451 | Porcelli | July 14, 1942 |
| 2,375,754 | Ballinger | May 15, 1945 |
| 2,451,236 | Oeth | Oct. 12, 1948 |
| 2,498,014 | Spencer, Jr., et al. | Feb. 21, 1950 |